(12) United States Patent
Li

(10) Patent No.: US 7,159,727 B2
(45) Date of Patent: Jan. 9, 2007

(54) SHELVING RACK CONNECTOR

(75) Inventor: Xiangming Li, Guangdong (CN)

(73) Assignee: La-La Imports LP, El Paso, TX (US)

( * ) Notice: Subject to any disclaimer, the term of this patent is extended or adjusted under 35 U.S.C. 154(b) by 195 days.

(21) Appl. No.: 10/944,474

(22) Filed: Sep. 17, 2004

(65) Prior Publication Data
US 2005/0184019 A1    Aug. 25, 2005

(51) Int. Cl.
*A47F 5/08* (2006.01)
(52) U.S. Cl. .................................................. 211/106
(58) Field of Classification Search ............. 211/106, 211/186, 181.1, 182, 206
See application file for complete search history.

(56) References Cited

U.S. PATENT DOCUMENTS

| | | | |
|---|---|---|---|
| 3,091,423 A | | 5/1963 | Butterworth |
| 4,531,697 A | | 7/1985 | Steiner et al. |
| 4,581,793 A | | 4/1986 | Micklitz |
| 4,632,344 A | * | 12/1986 | Lang et al. ............... 248/165 |
| 4,691,832 A | * | 9/1987 | Steiger ..................... 211/85.23 |
| 4,902,080 A | | 2/1990 | Berger |
| 5,072,839 A | * | 12/1991 | Arnone ..................... 211/187 |
| 5,161,783 A | | 11/1992 | German |
| 5,673,887 A | | 10/1997 | Hollingsworth et al. |
| 5,881,982 A | | 3/1999 | Hollingsworth et al. |
| 6,659,294 B1 | * | 12/2003 | Simard .................... 211/181.1 |

* cited by examiner

*Primary Examiner*—Sarah Purol
(74) *Attorney, Agent, or Firm*—Fitch, Even, Tabin & Flannery

(57) ABSTRACT

A connector for use in assembling a shelving member and rack or frame configuration that does not require tools for assembly. The shelving member includes an end with at least two depending shafts spaced apart a predetermined distance apart. The frame includes at least two apertures spaced apart a corresponding predetermined distance. The connector is used to coupling the shelving member to the frame member. The connector has a body or bridging section with at least two depending prongs spaced apart a distance corresponding to the predetermined distance. Each of the prongs has an upper end and a lower end, an aperture extending at least partially therethrough. The aperture of each prong is sized to receive one shaft of the shelving member, such as in frictional engagement. The apertures in the frame are also sized to receive the prongs of the connector, The connector can be used to join the shelving member and the frame or rack. Multiple shelving members and rack members can be joined together using a plurality of the connectors to assemble various rack and shelving units.

15 Claims, 3 Drawing Sheets

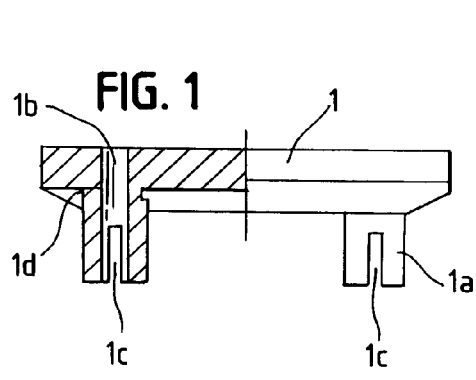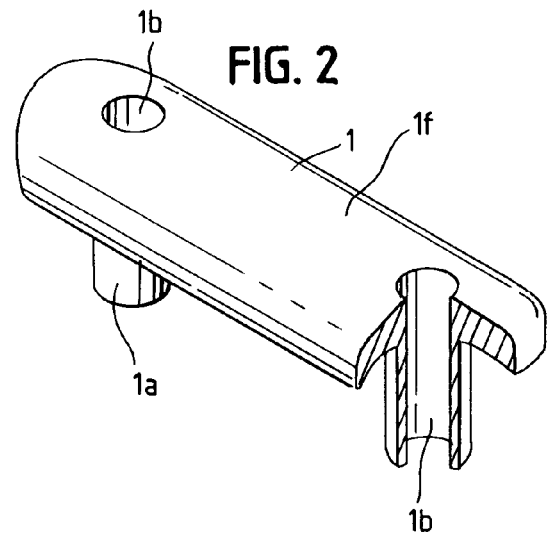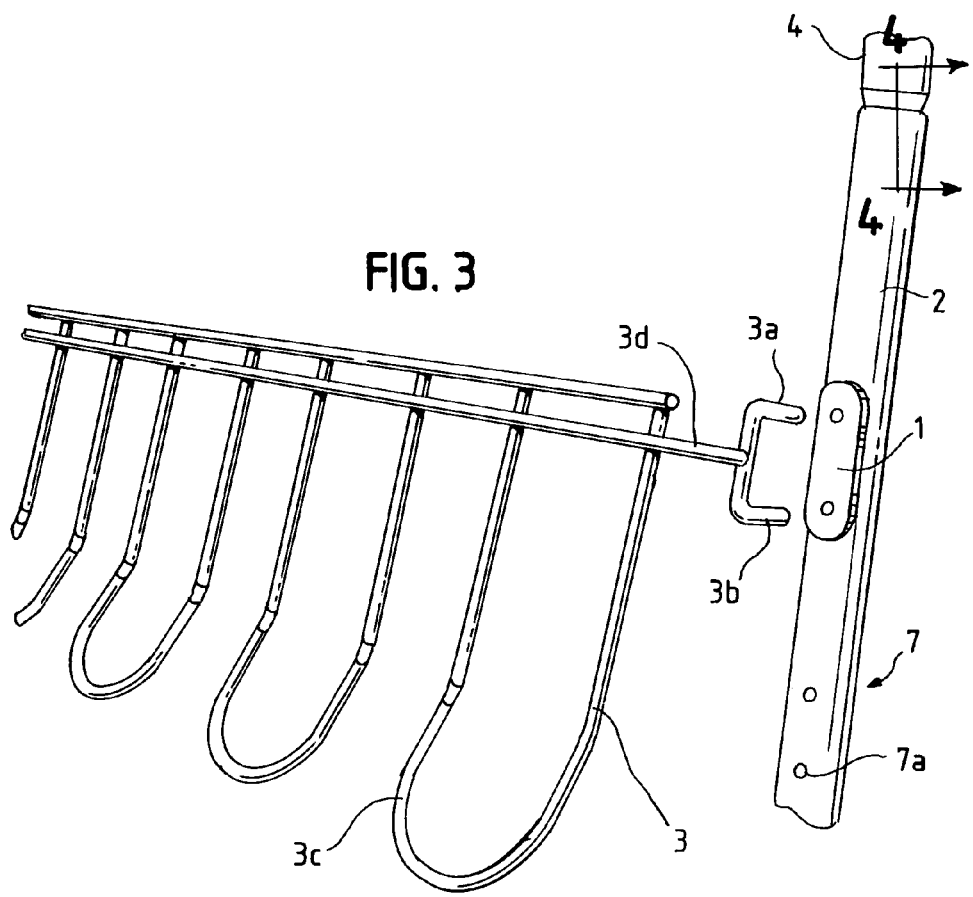

SHELVING RACK CONNECTOR

FIELD

The invention relates generally to a connector, and more particularly to a connector for use in a shelving rack.

BACKGROUND

When assembling racks, such as for shoes or shelving, frame pieces are often connected with screws to shelving components. However, using screws to assemble the frame and shelving requires the end user to perform complicated assembly operations. The use of screws also necessitates the provision of a tool, such as a screwdriver or allen wrench.

SUMMARY

A connector is provided for use in assembling a shelving member and rack or frame that does not require tools for assembly. The shelving member, which may be wire, includes an end with at least two depending shafts spaced apart a predetermined distance apart. The frame includes at least two apertures spaced apart a corresponding predetermined distance. The connector is used to coupling the shelving member to the frame member. The connector has a body or bridging section with at least two depending prongs spaced apart a distance corresponding to the predetermined distance. Each of the prongs has an upper end and a lower end, an aperture extending at least partially therethrough. The aperture of each prong is sized to receive one shaft of the shelving member, such as in frictional engagement. The apertures in the frame are also sized to receive the prongs of the connector, such as in frictional engagement. Accordingly, the connector can be used to join the shelving member and the frame or rack. Multiple shelving members and rack members can be joined together using a plurality of the connectors to assemble various rack and shelving units, such as a shoe rack.

BRIEF DESCRIPTION OF THE DRAWINGS

FIG. 1 is an elevation view including a partial section portion of a connector suitable for use with connecting shelving to a rack;

FIG. 2 is a perspective view including a partial section portion of the connector of FIG. 1;

FIG. 3 is a perspective view of the connector of FIG. 1 connected to a rack and being aligned for connection with a shelving;

DETAILED DESCRIPTION OF THE DRAWINGS

Figure 4:
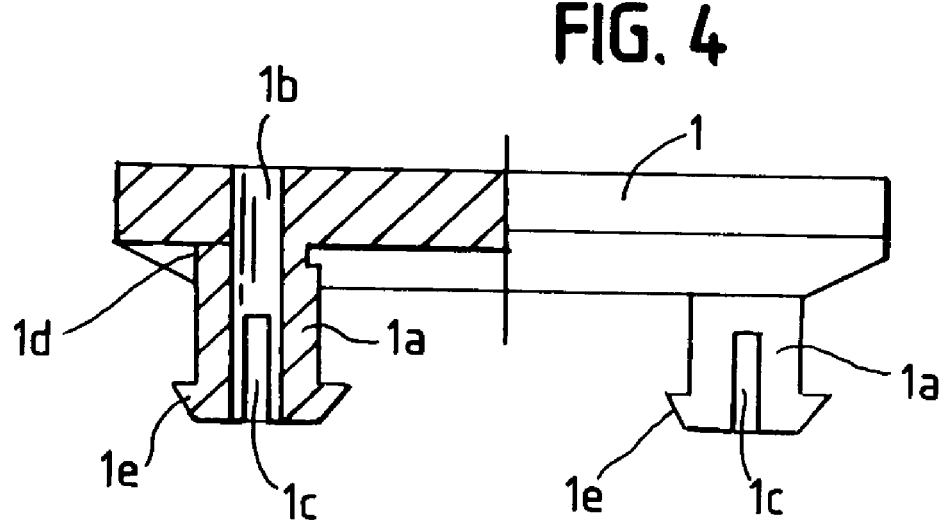
FIG. 4 is an elevation view including a partial section portion of a barbed connector suitable for use with connecting shelving to a rack.

The connectors of FIGS. 1–2 and 4–5 are suitable for use in connecting shelving members to rack components. The connectors 1 each have an elongated body 1f with a pair of prongs 1a depending from one side. An aperture 1b extends from a side of the body 1f opposite the prongs 1a through each of the prongs 1a, as illustrated in FIGS. 1–2 and 4–5.

The rack components 7 may be formed of a plurality of tubular rack portions 2 and 4 which are interconnected, as described in further detail below. The rack portions 2 and 4 have a plurality of aperture pairs 7a positioned along their length. Centerlines of the aperture pairs 7a are spaced a predetermined distance apart that corresponds to a predetermined distance that centerlines of the apertures 1b extending through the prongs 1a of the connectors 1 are spaced apart. Furthermore, the aperture pairs 7a of the rack portions 2 and 4 are sized to accommodate the prongs 1a of the connectors 1, as discussed in further detail below. Thus, the aperture pairs 7a are configure to received the prongs 1a of the connector 1 to connect the connector 1 to the rack components 7.

A shelving member 3 is provided with a pair of projections 3a and 3b which have a diameter selected to be approximately the same size are the diameter of the apertures 1b fo the connector 1. The shelving member 3 may be formed of wire. The projections or shafts 3a and 3b are spaced a predetermined distance apart that corresponds to the predetermined distance that centerlines of the apertures 1b extending through the prongs 1a of the connectors 1 are spaced apart. Accordingly, the projections 3a and 3b of the shelving member 3 can be inserted into the apertures 1a of the connector 1 to join the shelving member 3 to the connector 1. When the connector 1 is joined to the frame or rack 7, and the projections 3a and 3b of the shelving member 3 to the connector 1, the connector 1 joins the shelving member 3 to the rack 7. The use of a pair of projections 3a and 3b can reduce twisting of the shelving member 3 relative to the frame 2.

The sizing of the aperture pairs 7a is preferably, though not necessarily, selected to enable an interference fit between the portions of the rack 7 surrounding the aperture pairs 7a and the prongs 1a of the connector 1. The interference fit provides a secure connection between the prongs 1a and the portions of the rack 7 surrounding the aperture pairs 7a.

Figure 5:
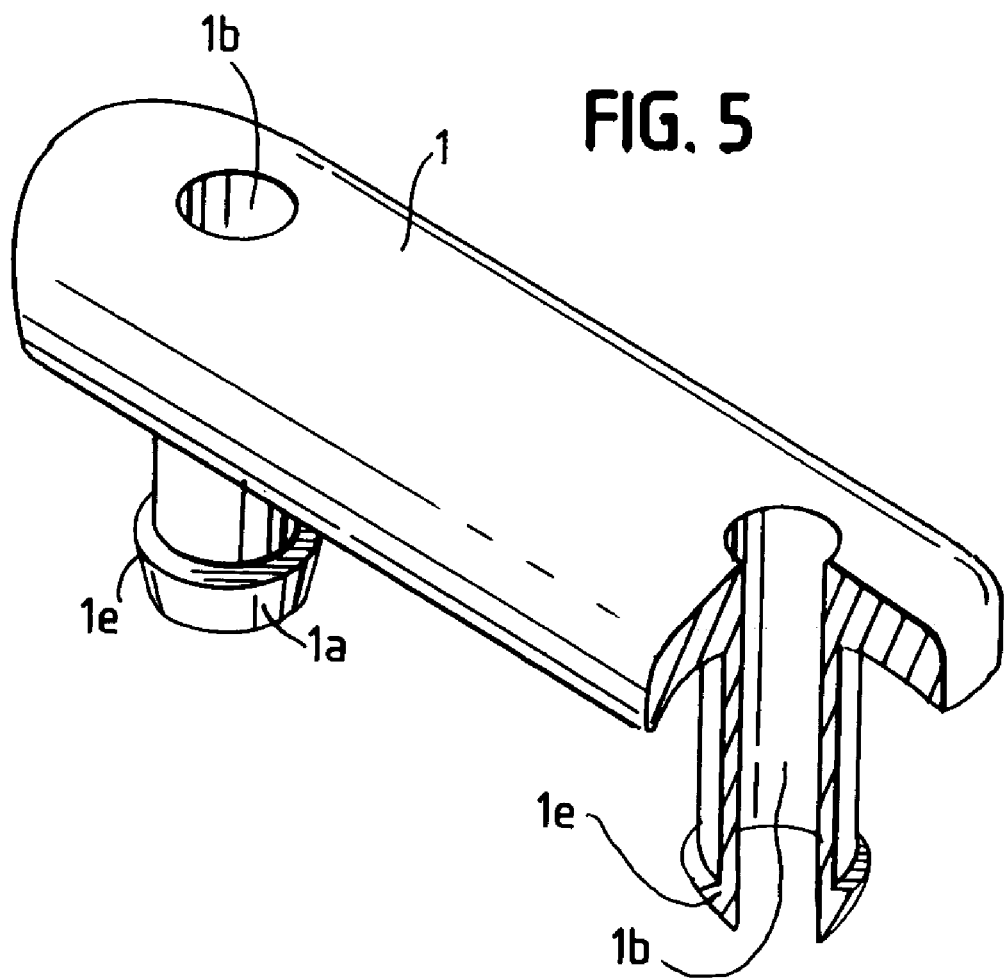
FIG. 5 is a perspective view including a partial section portion of the barbed connector of FIG. 4.

The connector 1 may be formed of a resilient, or slightly deformable, plastic. When the projections 3a and 3b of the shelving member 3 are inserted into the apertures 1b of the prongs 1a of the connector 1, the prongs 1a may slightly expand in diameter to further increase the interference fit between the prongs 1a of the connector 1 and the portions of the rack 7 surrounding the aperture pairs 7a. In addition or instead, the prongs 1a of the connector 1 may deform as they are inserted into the aperture pairs 7a to ensure a snug fit therebetween. If the aperture pairs 7a are defined by frame deflections projecting inwardly into the tubular frame member 7, at least partially surrounding the aperture pairs 7a, the frame deflections may restrict removal of the prongs 1a of the connector 1 from within the aperture pairs 7a. Depending upon the relative sizing of the prongs 1a, aperture pairs 7a, and frame deflections, the frame deflections may cut into or otherwise deform the prongs 1a of the connector 1, such as into a barb, if the prongs 1a are attempted to be removed from the aperture pairs 7a. A barb 1e may be provided on the end of the prongs 1a, as illustrated in FIGS. 4–5. The barb 1e can further assist in reducing the ease of removal of the prongs 1a from the aperture pairs 7a of the frame 7.

Figure 6:
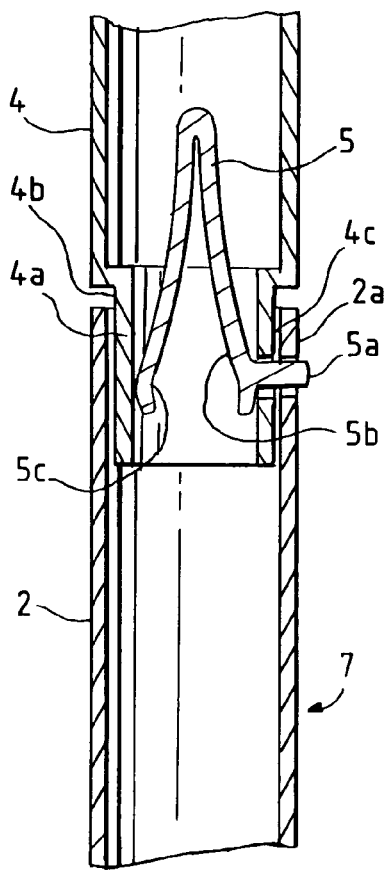
FIG. 6 is a section view of a portion of the rack member taken along line IV—IV of FIG. 3.

A discussed above, the rack components 7 may be formed of a plurality of tubular rack portions 2 and 4 which are interconnected. A spring connector 5 may be used to interconnect the tubular rack portions 2 and 4, although other methods of interconnecting the tubular rack portions 2 and 4 are suitable. The spring connector 5 is provided in a generally U-shape, as illustrated in FIG. 6. Each end of the spring connector 5b and 5c is positioned to abut against an interior sidewall 4a of a smaller diameter portion 4b of one of the tubular rack portions 4 and span the diameter thereof. A projection 5a is formed on one of the ends 5b and 5c of the spring connector 5. The projection 5a extends through an aperture 4c formed in one of the tubular rack portions 4. When the smaller diameter portion 4b of the one of the tubular rack portions 4 is inserted into the other of the tubular rack portions 2, and the aperture 4c is aligned with an aperture 2a in the other rack portion 2, the projection 5a extends through both apertures 4c and 2a, thereby joining the racks 2 and 4. Separation of the racks 2 and 4 can be accomplished by depressing the projection 5a by an amount sufficient to overcome the biasing force of the spring connector 5 and withdraw the projection 5a from the aperture 2a of the rack portion 2.

Figure 7:
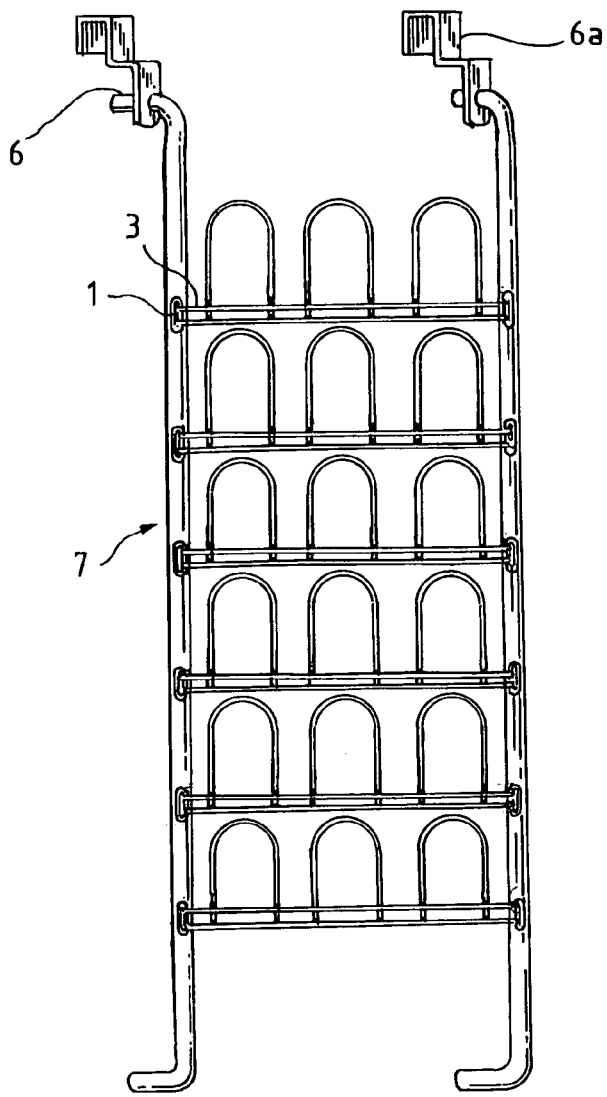
FIG. 7 is a perspective view of a configuration of rack and shelving assembled using the connector of FIGS. 1 and 2 or FIGS. 4 and 5.

Many different configurations of the shelving 3 and rack 7 can be assembled using the connector 1. For example, a shoe rack can be assembled using a pair of generally parallel frame members 7, each formed from a plurality of rack components 2 and 4, as illustrated in FIG. 7. The frame members 7 may each include an inwardly projecting portion 6 proximate the upper and lower ends to support the rack or frame members 7 away from a door, such as when over-the-door hooks 6a are used to attach the shoe rack to a door. Multiple shelving members 3 are connected to each of the rack members 7 using the connector 1. The shelving members may include a crossbar 3d sized to extend between the parallel rack members 7. Attached to the crossbar 3d are a plurality of loops 3c sized to fit inside a shoe. Although a particular shoe rack configuration is illustrated, may other types of assemblies may be configured to utilize the connector 1.

The invention claimed is:

1. A connector, shelving member and frame member assembly, the assembly comprising:
    at least one shelving member including an end with at least two depending shafts spaced apart a predetermined distance;
    at least one frame member including at least two apertures spaced apart the predetermined distance; and
    at least one connector for use in coupling the shelving member to the frame member, the connector having a bridging section with at least two depending prongs spaced apart the predetermined distance, each of the prongs having an upper end and a lower end, an aperture proximate the upper end for receiving one of the shafts of the shelving member, and a lower end adapted to be insertably secured into the apertures of the frame member, and the aperture of each prong being sized to receive one shaft of one shelving member in frictional engagement.

2. The assembly of claim 1, wherein the lower end of each prong includes a barb sized to generally restrict removal of the prong from the apertures of the frame member.

3. The assembly of claim 1, wherein the lower end of each prong is sized to be press-fit into one of the apertures of the frame member to generally resist removal of the prong from the aperture.

4. The assembly of claim 1, wherein the connector is adapted to create a snug fit between the connector, shelving member, and frame member, to reduce relative movement between the frame member and the depending shafts of the shelving member.

5. The assembly of claim 4, wherein the connector comprises a generally resilient plastic material.

6. The assembly of claim 1, wherein the at least one shelving member includes at least two shelving members, the at least one connector includes at least two connectors and the at least two apertures of the frame member includes at least 4 apertures.

7. The assembly of claim 1, wherein the shafts of the shelving member and the apertures of the connector are sized such that upon insertion of a shaft into an aperture of connector, the outside diameter of a substantial length of the prong expands.

8. The assembly of claim 1, wherein the at least one frame member includes at least two frame members, and the at least one connector includes at least two connectors, one connector being secured in one of the frame members and another connector inserted into another frame member, the at least one shelving member further including a second set of depending shafts, one set of depending shafts inserted into the connector of one of the frame members and the second set of depending shafts inserted into the connector of another frame member, thereby maintaining the frame members spaced apart a second predetermined distance and in generally parallel relation.

9. A connector, wire member and frame member assembly, the assembly comprising:
    at least one wire member including at least two depending shafts proximate a first end spaced apart a first predetermined distance, and at least two depending shafts proximate a second end spaced apart the first predetermined distance;
    at least two frame members each frame member including at least two apertures spaced apart the first predetermined distance; and
    at least two connectors for use in coupling the at least one wire member to the at least two frame members, each connector having a bridging section with at least two depending prongs spaced apart the first predetermined distance and having an aperture for receiving one of the shafts of the wire member, the prong being adapted to be insertably secured into the apertures of one of the at least two frame members, and the apertures of the prongs being sized to receive the shafts in frictional engagement.

10. The assembly of claim 9, wherein each of the at least two frame members includes at least one of the at least two connectors inserted therein, the at least one wire member connected to and extending between the at least two frame members maintaining the frame members spaced apart a second predetermined distance.

11. The assembly of claim 10, wherein the at least one wire member maintains the at least two frame members in generally parallel relation.

12. The assembly of claim 10, wherein the at least one wire member includes a plurality of wire members, the plurality of wire members maintain the at least two frame members spaced apart the second predetermined distance.

13. The assembly of claim 10, wherein the lower end of each prong includes a barb sized to generally restrict removal of the prong from the apertures of the frame member.

14. The assembly of claim 10, wherein the lower end of each prong is sized to press-fit into the apertures of the frame member to generally restrict removal of the prong from the apertures of the frame member.

15. A method of assembling a connector, wire member, and frame member assembly, the method including:

providing at least one wire member including an end with at least two depending shafts spaced a predetermined distance apart;

providing at least one frame member including at least two apertures spaced the predetermined distance apart;

providing at least one connector for use is coupling the wire member to the frame member, the connector having a bridging section with at least two depending prongs spaced apart the predetermined distance, each of the prongs having an upper end and a lower end, an aperture proximate the upper end for receiving one of the shafts of the wire member, and a lower end sized to be insertably secured into the apertures of the frame member, and the apertures of the prongs being sized to receive the shafts of the wire member in frictional engagement;

inserting each prong of the at least one connector into a corresponding aperture of the at least one frame member; and inserting each shaft of the at least one wire member into a corresponding aperture of the at least one connector.

\* \* \* \* \*